(12) United States Patent
Singh et al.

(10) Patent No.: US 9,042,427 B2
(45) Date of Patent: May 26, 2015

(54) METHODS FOR GENERATING MULTI-LEVEL PSEUDO-RANDOM SEQUENCES

(76) Inventors: Mohit Singh, Mumbai (IN); Shalabh Gupta, Mumbai (IN)

( * ) Notice: Subject to any disclaimer, the term of this patent is extended or adjusted under 35 U.S.C. 154(b) by 0 days.

(21) Appl. No.: 14/005,160

(22) PCT Filed: Mar. 14, 2012

(86) PCT No.: PCT/IN2012/000174
§ 371 (c)(1),
(2), (4) Date: Sep. 13, 2013

(87) PCT Pub. No.: WO2012/123969
PCT Pub. Date: Sep. 20, 2012

(65) Prior Publication Data
US 2014/0003805 A1    Jan. 2, 2014

(30) Foreign Application Priority Data
Mar. 14, 2011   (IN) .......................... 724/MUM/2011

(51) Int. Cl.
*H04B 1/00*    (2006.01)
*H04B 10/07*   (2013.01)
*H04W 24/06*   (2009.01)

(52) U.S. Cl.
CPC .............. *H04B 10/07* (2013.01); *H04W 24/06* (2013.01)

(58) Field of Classification Search
CPC ......... H04B 17/0002–17/0037; H04B 17/0062
USPC .......... 375/140, 141, 146, 240; 708/250, 252, 708/255
See application file for complete search history.

(56) References Cited

U.S. PATENT DOCUMENTS

| | | | |
|---|---|---|---|
| 6,556,555 B1 * | 4/2003 | Miller et al. .................. | 370/335 |
| 6,763,363 B1 | 7/2004 | Driscoll | |
| 2003/0070126 A1 | 4/2003 | Werner et al. | |
| 2004/0015527 A1 * | 1/2004 | Sriram et al. ................. | 708/250 |
| 2005/0024685 A1 | 2/2005 | Krol et al. | |

FOREIGN PATENT DOCUMENTS

WO    WO03025599 A1    3/2003

OTHER PUBLICATIONS

Suits, B. Physics of Music—Notes Michigan tech—Apr. 8, 2010.
Wang, S enhancing Brain Computing Interfacing through Advanced Independent Component Analysis Techniques Mar. 2009.

* cited by examiner

*Primary Examiner* — Dac Ha

(57) ABSTRACT

A method for generating multi-level (or multi-bit) pseudo-random sequences is disclosed. This embodiment relates to communication systems, and more particularly to generating multi-level pseudo random symbol sequence. Present day systems do not employ effective mechanisms for generation of multi level PRBS in order to increase the data communication rates. Further, these systems do not cover all the possible transitions for the outputs of the system. The proposed system employs mechanisms in order to generate PRBS signals for producing multi levels signals to the electronic components. The mechanism employs alternate bit tapping techniques. In the alternate bit tapping technique, bits are tapped alternatively to determine the current state and the next state of the system. In addition, the mechanism also covers all the possible states of the output vector with transitions between the output states. This ensures that high data rates are obtained for a given bandwidth of operation.

9 Claims, 17 Drawing Sheets

FIG 8

| $m$ | $h(x)$ | $m$ | $h(x)$ |
|---|---|---|---|
| 2 | $x^2 + x + 1$ | 21 | $x^{21} + x^{19} + 1$ |
| 3 | $x^3 + x^2 + 1$ | 22 | $x^{22} + x^{21} + 1$ |
| 4 | $x^4 + x^3 + 1$ | 23 | $x^{23} + x^{18} + 1$ |
| 5 | $x^5 + x^3 + 1$ | 24 | $x^{24} + x^{23} + x^{21} + x^{20} + 1$ |
| 6 | $x^6 + x^5 + 1$ | 25 | $x^{25} + x^{22} + 1$ |
| 7 | $x^7 + x^6 + 1$ | 26 | $x^{26} + x^{25} + x^{24} + x^{20} + 1$ |
| 8 | $x^8 + x^6 + x^5 + x^4 + 1$ | 27 | $x^{27} + x^{26} + x^{25} + x^{22} + 1$ |
| 9 | $x^9 + x^5 + 1$ | 28 | $x^{28} + x^{25} + 1$ |
| 10 | $x^{10} + x^7 + 1$ | 29 | $x^{29} + x^{27} + 1$ |
| 11 | $x^{11} + x^9 + 1$ | 30 | $x^{30} + x^{29} + x^{26} + x^{24} + 1$ |
| 12 | $x^{12} + x^{11} + x^8 + x^6 + 1$ | 31 | $x^{31} + x^{28} + 1$ |
| 13 | $x^{13} + x^{12} + x^{10} + x^9 + 1$ | 32 | $x^{32} + x^{30} + x^{26} + x^{25} + 1$ |
| 14 | $x^{14} + x^{13} + x^{11} + x^9 + 1$ | 33 | $x^{33} + x^{20} + 1$ |
| 15 | $x^{15} + x^{14} + 1$ | 34 | $x^{34} + x^{31} + x^{30} + x^{26} + 1$ |
| 16 | $x^{16} + x^{14} + x^{13} + x^{11} + 1$ | 35 | $x^{35} + x^{33} + 1$ |
| 17 | $x^{17} + x^{14} + 1$ | 36 | $x^{36} + x^{25} + 1$ |
| 18 | $x^{18} + x^{11} + 1$ | 37 | $x^{37} + x^{36} + x^{33} + x^{31} + 1$ |
| 19 | $x^{19} + x^{18} + x^{17} + x^{14} + 1$ | 38 | $x^{38} + x^{37} + x^{33} + x^{32} + 1$ |
| 20 | $x^{20} + x^{17} + 1$ | 39 | $x^{39} + x^{35} + 1$ |

FIG 9

| State No. | STATE | | | | LFSR Output (Base 10) | DAC Input (Base 10) |
|---|---|---|---|---|---|---|
| | B3 | B2 | B1 | B0 | | |
| 0 | 1 | 0 | 0 | 0 | 8 | 0 |
| 1 | 0 | 1 | 0 | 0 | 4 | 2 |
| 2 | 0 | 0 | 1 | 0 | 2 | 0 |
| 3 | 1 | 0 | 0 | 1 | 9 | 1 |
| 4 | 1 | 1 | 0 | 0 | 12 | 2 |
| 5 | 0 | 1 | 1 | 0 | 6 | 2 |
| 6 | 1 | 0 | 1 | 1 | 11 | 1 |
| 7 | 0 | 1 | 0 | 1 | 5 | 3 |
| 8 | 1 | 0 | 1 | 0 | 10 | 0 |
| 9 | 1 | 1 | 0 | 1 | 13 | 3 |
| 10 | 1 | 1 | 1 | 0 | 14 | 2 |
| 11 | 1 | 1 | 1 | 1 | 15 | 3 |
| 12 | 0 | 1 | 1 | 1 | 7 | 3 |
| 13 | 0 | 0 | 1 | 1 | 3 | 1 |
| 14 | 0 | 0 | 0 | 1 | 1 | 1 |
| 15=0 | 1 | 0 | 0 | 0 | 8 | 0 |
| 16=1 | 0 | 1 | 0 | 0 | 4 | 2 |

METHODS FOR GENERATING MULTI-LEVEL PSEUDO-RANDOM SEQUENCES

PRIORITY DETAILS

The present application is a National Phase Application for PCT Application PCT/IN2012/000174 based on, and claims priority from, IN Application Number 724/MUM/2011, filed on 14 Mar. 2011, the disclosure of which is hereby incorporated by reference herein.

TECHNICAL FIELD

This embodiment relates to optical communication systems, and more particularly to generating multi-level pseudo random symbol sequence.

BACKGROUND

With the increase in number of electronic devices, there is an ever growing demand for higher data rate communication in optical/wireless communication system. To increase the capacity by improving spectral efficiency, multi-level modulation formats are being explored in wireless, wired and optical communication systems. Multi-level modulation formats enables construction of bandwidth efficient modulation codes and allows the construction of modulation codes systematically with arbitrary large minimum squared Euclidean distance from component codes in conjunction with proper bits-to-signal mapping. The multilevel signal transmission system necessitates correct transmission of pulse amplitude at the expense of the reduction of the bandwidth necessary for the signal transmission.

To ensure that components used in communication networks using multi-level modulation formats function in the real world, such components need to be tested. Examples of such components include Digital to Analog Converters (DAC), analog memories, floating gates and so on. Generation of multi-level random test signals, which are required to test the components, is a costly and complicated process. For example, for generating high speed 8 level signals for a 64-QAM 112 Gbps optical transmission equipment requires an Electrical-Optical-Electrical (EOE) conversion technique which is both costly and complicated.

Ramp and sinusoidal signal generation techniques have been used for generating multi-level random test signals for DACs. However, generating such signals consumes a lot of area and power when implemented at high speeds. Further, the above mentioned schemes are not random enough to simulate the random nature of data present in a real-time communication network which proves a hindrance in determining the dynamic behaviour (linear and non-linear) of the components. The dynamic behaviour becomes important in cases where the network is operating at high speeds resulting in an alteration of the high frequency components of the signals due to parasitic components.

Pseudo Random Bit Stream (PBRS) generators have been used to test electronic components. The PRBS generator is a random binary number generator and produces a predefined sequence of 1's and 0's, with 1 and 0 occurring with the same probability. It is 'random' in a sense that the value of an element of the sequence is independent of the values of any of the other elements. It is 'pseudo' because it is deterministic and after N elements it starts to repeat itself, unlike real random sequences. A sequence of consecutive $n*(2^n-1)$ bits comprise one data pattern, and this pattern will repeat itself over time. However, the PRBS generator does not cover all transitions between output levels, as a fixed transition pattern is followed. This makes it difficult to visualize the performance of the components used in communication networks using multi-level modulation formats resulting in wrong characterization of the component under test, especially for high speed applications. Further, the outputs of the components under test for random input bit streams may be difficult to analyze.

Although some of the present day systems employ the PRBS generators in order to test Digital circuits but they haven't been employed for testing electronic components as they do not cover transitions between all the output levels. Similarly, the PRBS generators have not been systematically used to test communication systems employing multi-level or multi-bit symbol (one or two-dimensional) sequences.

To generate sequences for coherent links, common approach is to use PRBS sequence of fixed lengths and de correlate them by delaying with different symbol periods which are chosen arbitrarily. Since, there is no standard procedure to decide the delay periods, complete text vector coverage may not be possible and the BER (bit error rates) estimation may be inaccurate.

For a complete test coverage, multi level pseudo random sequences that can be represented as de Brujin sequences are required. A de Brujin sequence, B (k, n) of length $k^n$ (in case of multi level sequences) is equivalent to a PRBS of length $2^n-1$ (for a serial link), with the exception that the PRBS lacks the sub-sequence with n consecutive zeros. Further, k denotes the number of possible symbol values (or alphabet size) in de Brujin sequence and the sequence includes all possible k-ary symbol sub-sequences of length n. A sequence that has all possible subsequences of (at least) length n should be used if dispersion in the channel results in one particular symbol affecting n-1 adjacent symbols.

SUMMARY

Embodiments herein disclose a method for generating multi level pseudo random symbol sequences for testing a transmission system, the method employing nth bit tapping mechanisms, where the method comprises of generating pseudo random symbol sequences employing a linear feedback shift register; checking if the symbol sequences satisfy a pre-defined condition; tapping bits to the symbol sequences as per the condition for producing a multi level pseudo random symbol sequence to be fed to the transmission system.

Further, disclosed herein is a system for generating multi level pseudo random symbol sequences for testing a transmission system, the system comprising at least one linear feedback shift register, further the system adapted with at least one means for generating pseudo random symbol sequences employing the linear feedback shift register; checking if the symbol sequences satisfy a pre-defined condition; and tapping bits to the symbol sequences as per the condition for producing a multi level pseudo random symbol sequence to be fed to the transmission system.

Disclosed herein is a method for generating multi level pseudo random symbol sequences for testing a transmission system, where the method comprises of generating an N bit PseudoRandom Symbol Sequence (PRBS) by a PRBS generator; converting N delay values for the PRBS into delay vectors; creating a transformation matrix using the delay vectors; and calculating percentage coverage of test vector from the transformation matrix.

Disclosed herein is a system for generating multi level pseudo random symbol sequences for testing a transmission system, where the system comprises at least one means comprising of generating an N bit PseudoRandom Symbol Sequence (PRBS) by a PRBS generator; converting N delay values for the PRBS into delay vectors; creating a transformation matrix using the delay vectors; and calculating percentage coverage of test vector from the transformation matrix.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This embodiment is illustrated in the accompanying drawings, through out which like reference letters indicate corresponding parts in the various figures. The embodiments herein will be better understood from the following description with reference to the drawings, in which:

FIG. 8 is a table depicting primitive polynomials for $m \leq 39$ used to obtain MLS for a LFSR, according to embodiments as disclosed herein;

FIG. 9 is a table depicting output sequence of a 4-bit LFSR, according to embodiments as disclosed herein;

DETAILED DESCRIPTION OF EMBODIMENT

Figure 1:
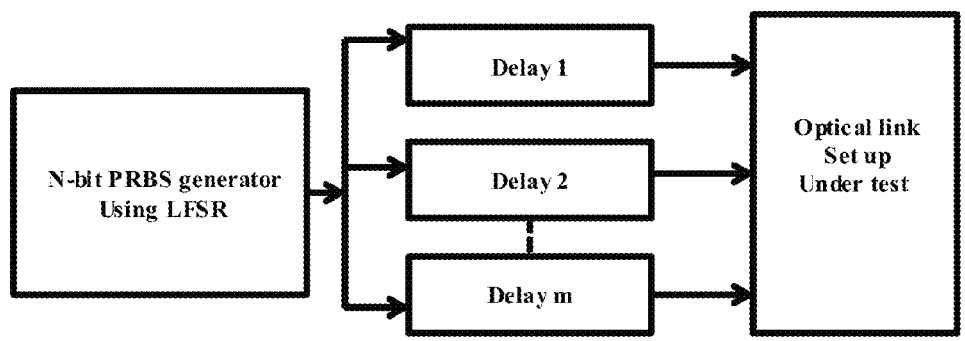
FIG. 1 is a flow diagram depicting the process of generating multi level signals, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve a technique for generating multi-level test signals by providing systems and methods thereof. Referring now to the drawings, and more particularly to FIGS. 1 through 11, where similar reference characters denote corresponding features consistently throughout the figures, there are shown preferred embodiments.

FIG. 1 is an exemplary block diagram which describes the matrix rank method, according to the embodiments disclosed herein. The $2^N-1$ length PRBS is commonly generated using N-bit LFSRs (linear feedback shift registers) in maximum length sequence (MLS) configuration. If transmission system uses N-bit symbols, at least an N-bit LFSR is required to cover all possible symbols. Further, an all zero state of LFSR does not occur in MLS.

Longer sequences of independent test vectors are required to characterize the inter symbol interference caused by dispersion effects to ensure that not only all the symbols are covered, but also symbol to symbol transitions are covered. For m bit symbols and memory depth of n-1 symbols, an LFSR at least of size N=m*n bits is required. Further, if a transmission system using 4 bits/symbol (such as DP-QPSK) is to be tested for a memory depth of 1 symbol period, a minimum of 8-bit LFSR is required.

For the delay values ($d_1$, $d_2$, $d_3$, & $d_4$), the corresponding four 8 bit delay vectors are calculated. For, the memory effect of 1 clock period, the four 8 bit delay vector for delay values $d_1+1$, $d_2+1$, $d_3+1$ and $d_4+1$ are calculated. Further, the eight 8 bit delay vectors are stacked to form Boolean matrix of order 8 and its rank is calculated to find the percentage coverage of test sectors. For a test set up which requires a memory depth of 2 clock periods apart from the eight 8 bit delay vectors, four additional delay vectors (for $d_1+2$, $d_2+2$, $d_3+2$ and $d_4+2$) are calculated. The twelve 12 bit delay vectors are stacked to form the Boolean matrix required for the percentage coverage of test vectors. The alternate bit tapping technique leads to the optimal test vector coverage for an N-bit LFSR because it produces an identity Boolean transformation matrix (assuming $d_1=0$, without loss of generality), having a full rank leading to a 100% test vector coverage.

Figure 2:
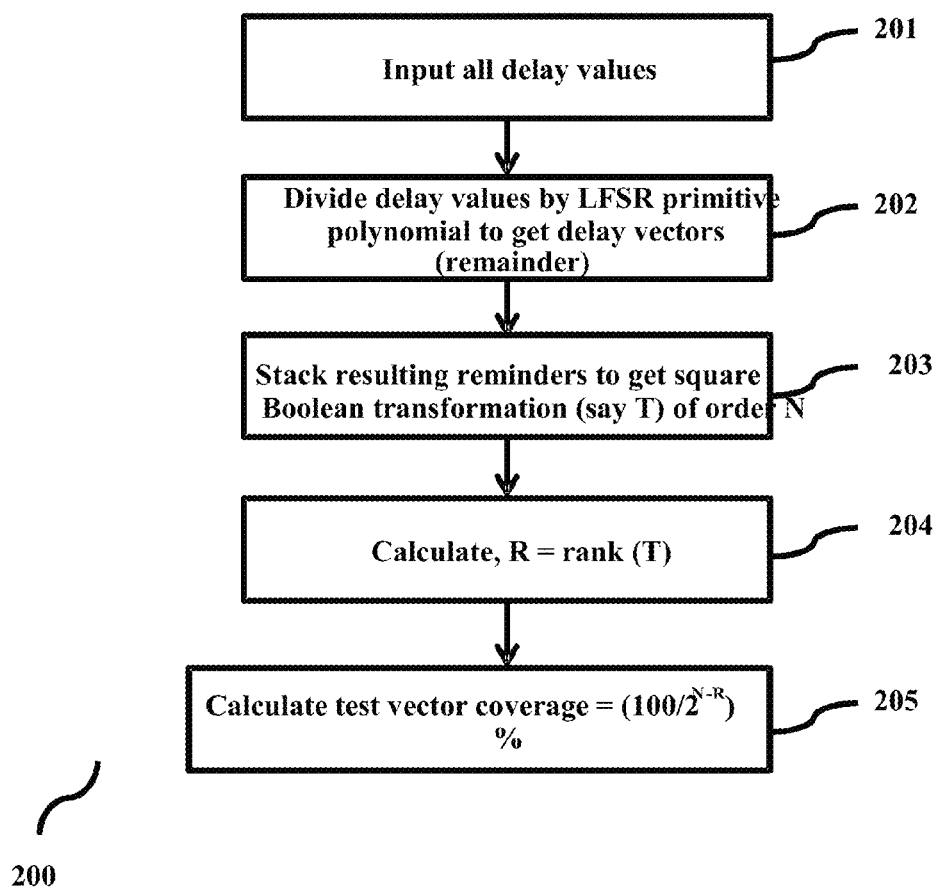
FIG. 2 is a flow diagram which depicts the method for calculating test vector coverage for a given test set up using the LFSR primitive polynomial and delay values according to the embodiments disclosed herein.

FIG. 2 is a flow diagram which depicts the method for calculating test vector coverage for a given test set up using the LFSR primitive polynomial and delay values according to the embodiments disclosed herein. Initially, all delay values ($d_1$, $d_2$, $d_3$, . . . $d_n$) are input (201). Each delayed LFSR sequence can be obtained by Boolean division of delay value by the LFSR primitive polynomial and XORing the delay values in the remainder. For example, for a PRBS produced by a 4 bit LFSR with primitive polynomial $x^4+x^3+1$, the LFSR serial output delayed by 7 symbol periods can also be obtained by XORing output sequences delayed by 0,1and2 clock periods, as the Boolean division of $x^7$ by $x^4+x^3+1$ gives $x^2+x+1$ as remainder.

Further, all delay values are divided (202) by LFSR primitive polynomial and stacked (203) together to form an N*N Boolean transformation matrix (T). The Boolean transformation matrix (T) on multiplication with the LFSR current state would result in the delayed output. For example, the transformation matrix with d1=, d2=, d3= & d4=for a 4 bit LFSR would be, $$T = \begin{bmatrix} 1 & 0 & 1 & 0 \\ 0 & 0 & 1 & 0 \\ 1 & 0 & 0 & 1 \\ 1 & 0 & 1 & 0 \end{bmatrix} \begin{matrix} \leftarrow D1 \\ \leftarrow D2 \\ \leftarrow D3 \\ \leftarrow D4 \end{matrix} \right\} \text{delay vectors}$$

Further, the rank is calculated (204) which is given by R=rank(T) and the percentage cover can be calculated (205) as:

$$\text{Test vector coverage} = \left(\frac{100}{2^{N-R}}\right) - . \quad (1)$$

The various actions performed in method 200 may be performed in the order presented, in a different role or simultaneously. Further, in some embodiments, some actions listed in FIG. 2 may be omitted.

Figure 3:
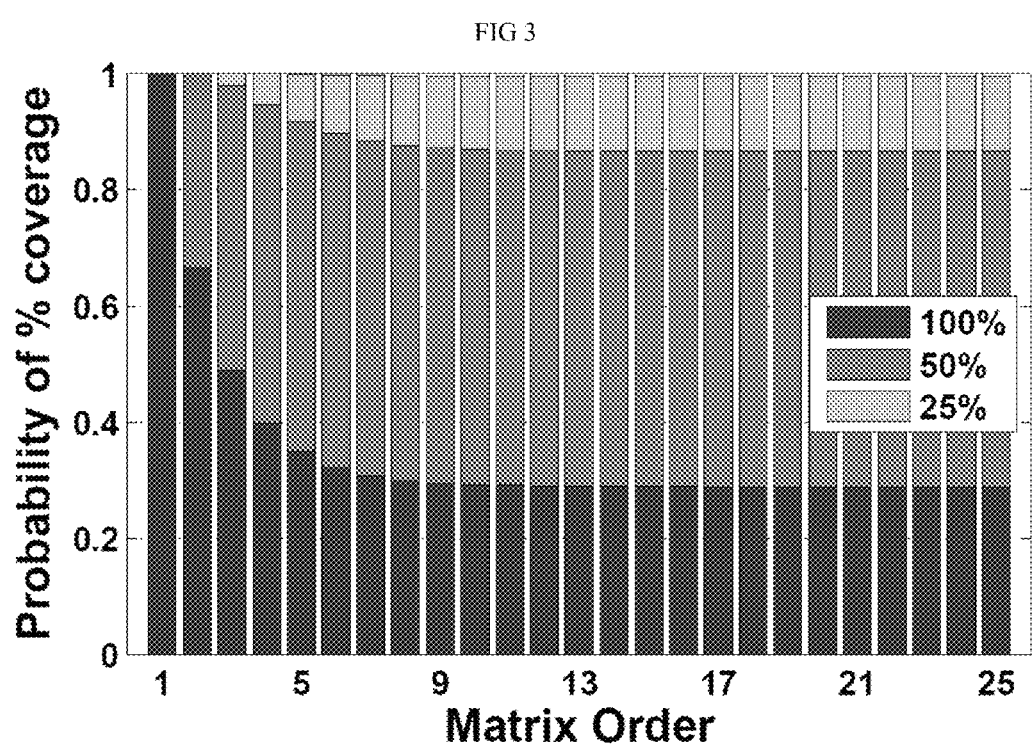
FIG. 3 is an exemplary diagram which indicates the probability of percentage coverage of test vectors as disclosed in the embodiments herein.

FIG. 3 is an exemplary diagram which indicates the probability of percentage coverage of test vectors as disclosed in the embodiments herein. The probability of percentage coverage has been plotted in FIG. 4. For a higher order matrix (N>9), there is <29% probability of full test vector coverage for randomly chosen delays. Therefore one way of ensuring higher test vector coverage even after use of random delays is to use a longer LFSR.

Figure 4:
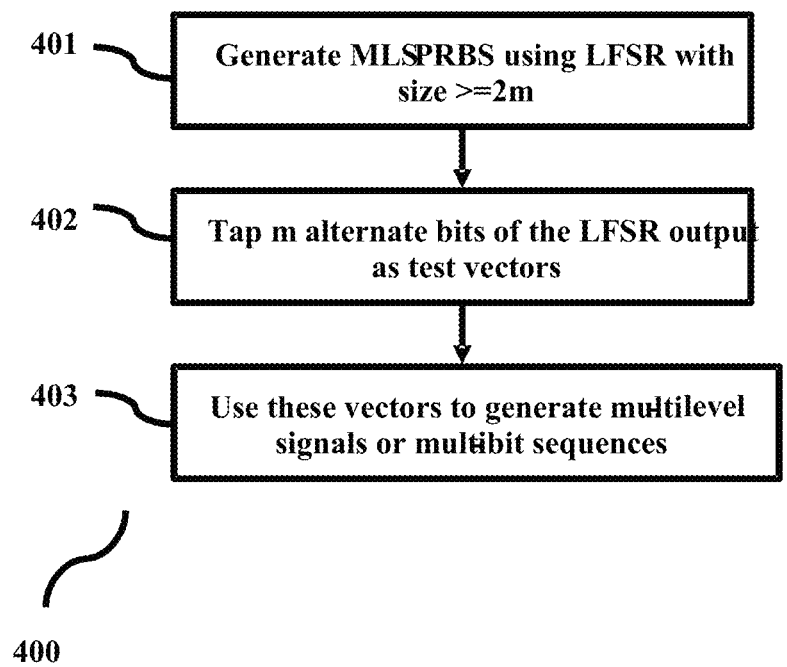
FIG. 4 is a flow diagram depicting the process of generating multi level signals, according to embodiments as disclosed herein

FIG. 4 is a flow diagram depicting the process of generating multi level signals, according to embodiments as disclosed herein. Initially Maximum Length Sequence (MLS) PRBS is generated (401) using LFSR. The size of the sequence is greater than or equal to twice the number of bits of the DAC i.e., >=2 m. Further, m alternate bits of the LFSR output are tapped (402) as test vectors. The generated bit vectors are then employed as inputs to generate (403) multi level signals or multi symbol sequences. The various actions in method 400 may be performed in the order presented, in a different order or simultaneously. Further, in some embodiments, some actions listed in FIG. 4 may be omitted.

In an embodiment, the implementation of PRBS generator is based on the linear feedback shift register (LFSR). A linear feedback shift register (LFSR) is a shift register whose input bit is a linear function of its previous state. The only linear function of single bits is XOR, thus it is a shift register whose input bit is driven by the exclusive-or (XOR) of some bits of the overall shift register value. The initial value of the LFSR is called the seed, and because the operation of the register is deterministic, the stream of values produced by the register is completely determined by its current (or previous) state. Likewise, because the register has a finite number of possible states, it must eventually enter a repeating cycle. However, an LFSR with a well-chosen feedback function can produce a sequence of bits which appears random and which has a very long cycle. A linear feedback shift register (LFSR) is the core of any digital system that relies on pseudo random symbol sequences (PRBS), with applications ranging from cryptography and bit-error-rate measurements, to wireless communication systems employing spread spectrum or CDMA techniques.

Figure 5A:
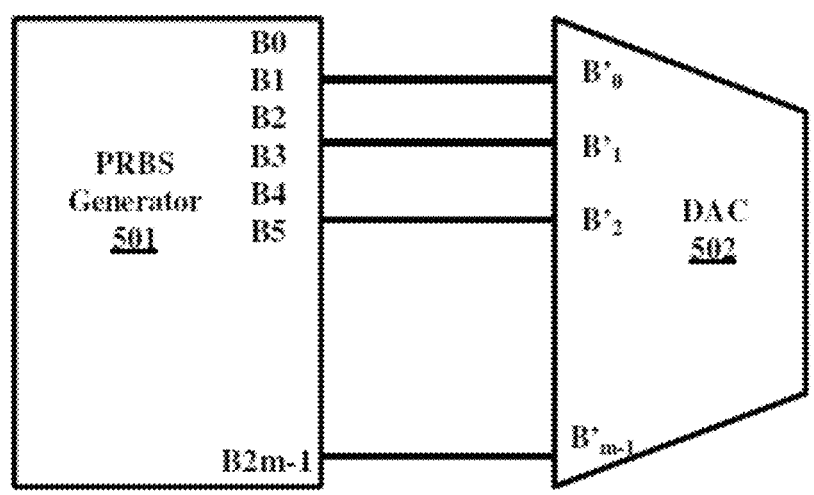
FIG. 5a depicts a 2m-bit PRBS generator, according to embodiments as disclosed herein.

FIG. 5a depicts a 2 m-bit PRBS generator, according to embodiments as disclosed herein. PRBS generator 201 is connected to DAC 202. Output of PRBS generator 201 serves as input for DAC 202. A typical m-bit PRBS generator made of LFSR (Linear Feedback Shift Register) can be used to generate $2^m$- 1 different sequence to test an m-bit DAC and cover all-but-one test-vectors. The generated test-vectors follow a fixed transition pattern.

Proposed here is an Alternate-bit-tapping technique to cover all the transitions in LFSR. The aim of this technique is to generate multi-level signals using a 2 m-bit PRBS generator fed to the DAC with all test vectors and transitions between these test vectors (except 0-0 transition), in minimum number of cycles. This is possible by tapping all even or all odd bits of 2 m-bit PRBS generator and feeding it to an m-bit DAC. It also guarantees to be the necessary and sufficient condition for the same and is done within minimum time.

An m-bit PRBS generator constructed using an LFSR 101 generates $2^m$-1 maximum sequence length. A maximum length sequence (MLS) is a type of pseudorandom binary sequence. They are symbol sequences generated using maximal length linear feedback shift registers (LFSR) and are so called because they are periodic and reproduce every binary sequence that can be reproduced by the shift registers (i.e., for length-m registers they produce a sequence of length $2^m$-1). A MLS is also sometimes called an n-sequence or an m-sequence. MLSs are spectrally flat, with the exception of a near-zero DC term.

Figure 5B:
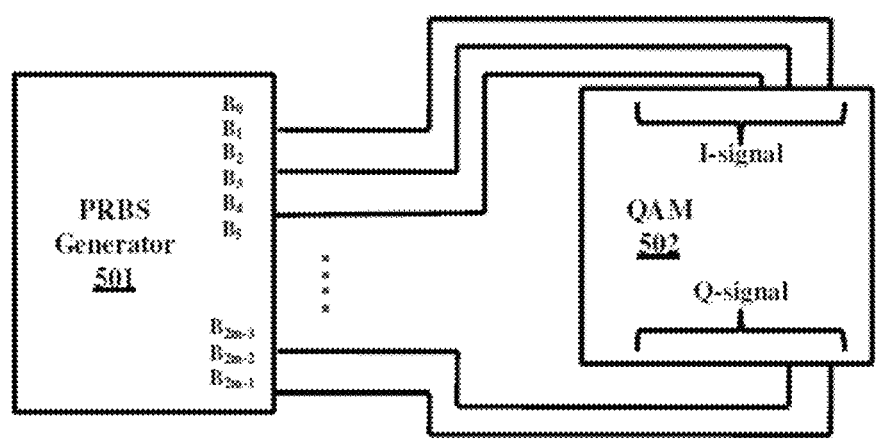
FIG. 5b depicts implementation for testing a QAM modulator, according to embodiments as disclosed herein.

FIG. 5b depicts implementation for testing a QAM modulator, according to embodiments as disclosed herein. QAM, also known as I & Q modulation, is a method for sending two separate (and uniquely different) channels of information. Carrier is shifted to create two carriers: Sin and Cos versions. The two modulation inputs are applied to two separate balanced modulators (BM) each of which are supplied with the Sin or Cos carriers, respectively. The outputs of both modulators are algebraically summed resulting into I & Q information. In the digital telecommunication systems QAM case, a finite number of at least two phases and at least two amplitudes are used. This method of modulation has the advantage of reducing or eliminating inter modulation interference caused by a continuous carrier near the modulation sidebands. The 2m-bit PRBS generator 203 generates $2^{2m}$-1 maximum sequence length (MLS). Similar to FIG. 2a the LFSR output bits are are tapped alternately and the generated sequence is passed to QAM modulator 204. QAM modulator 204 receives sequence and considers some of them as Q signals while it consider some sequence as I signal. Later, it performs modulation on these signals.

Figure 5C:
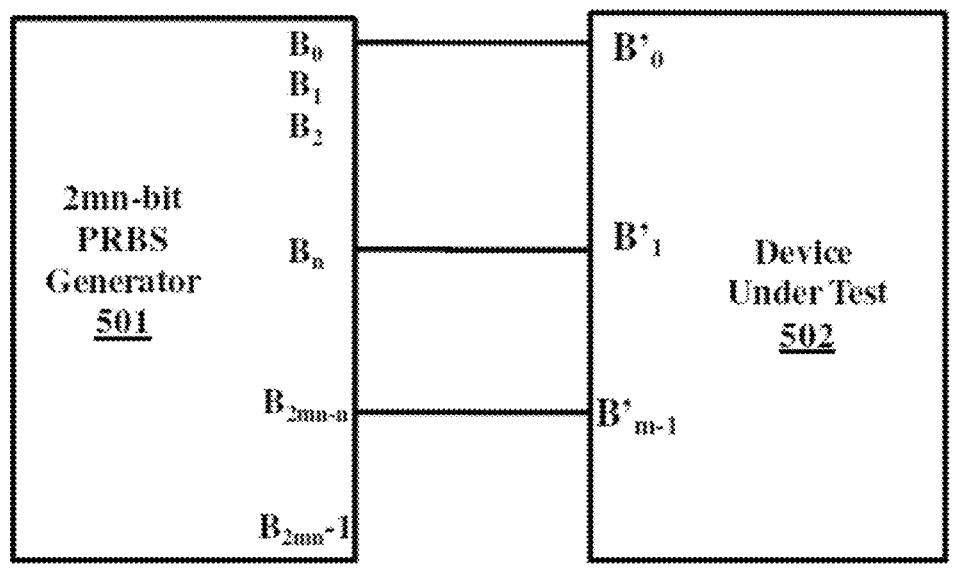
FIG. 5c depicts the generic nth bit tapping for memory depth of up to n-1 symbols, according to embodiments as disclosed herein.

FIG. 5c depicts the generic nth bit tapping for memory depth of up to n-1 symbols, according to embodiments as disclosed herein. PRBS generator 205 is connected to device under test 206. Output of PRBS generator 205 serves as input for device under test 206. A 2mn-bit PRBS generator 205 made of LFSR generates $2^{mn}$-1 different sequence to test an m-bit device under test 206. The generated test-vectors fed to the device under test will cover all possible transitions between current and previous n-1 states. For testing of an m-bit device 206 with all transitions between all possible output levels of device covered (except 0-0 transition), a 2mn-bit LFSR is required with its bits tapped alternately and fed to the device under test 206 input. These bits can be all even or all odd bits of PRBS generator.

Figure 6:
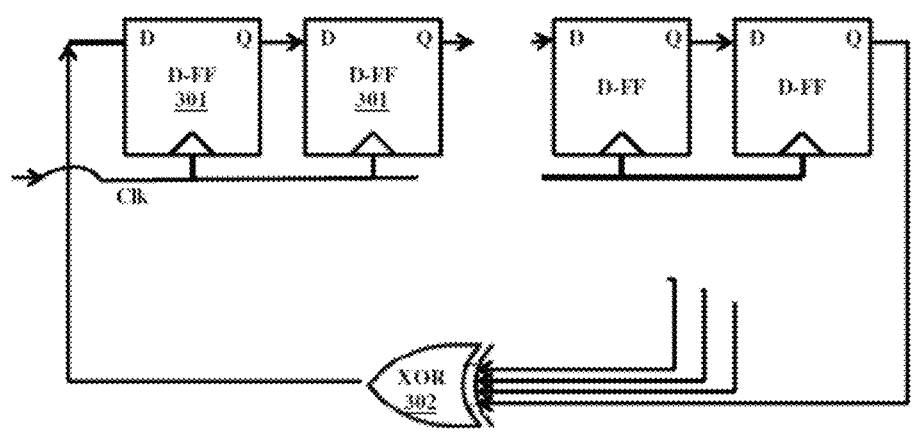
FIG. 6 depicts a m-bit PRBS generator using a LFSR, according to embodiments as disclosed herein.

FIG. 6 depicts an m-bit PRBS generator using an LFSR, according to embodiments as disclosed herein. As shown in FIG. 3 a PRBS generator made from LFSR consists of a shift-register made up of cascaded memory element like a flip-flop 301 with the output of the last element XORed 302 with that of one or more intermediate memory element outputs, and fed to the input of the shift-register to get the PRBS. The XOR operation is performed by an XOR gate 302. The minimum required length of LFSR is a function of the Number of bits per symbol used in the communication link or the DAC, and the Memory depth. This can be given by formula:

LFSR length=Number of bits per symbol*(memory depth+1)

Memory depth signifies the number of symbols occurring before the current input, which affect the current state output. So, for an output which is also affected by last two symbols can be said to have a memory depth of 2.

Hence, for example, from the formula to test a 4-bit DAC (or a 16-QAM system) with a memory depth of 1, an 8-bit LFSR is required, which has already been discussed previously. Similarly, to test the same DAC (or an optical link) for a memory depth 2, a 12-bit LFSR would be needed. Syntactically, this arrangement can be written as:

An N/(M+1) setup, where N=LFSR length and M=memory depth

So, A 8-bit LFSR, testing a DAC (or an optical link) with memory depth of 1 is written as 8/2 setup, which means it has to have every 2nd bit of LFSR tapped and can maximum test a 4-bit DAC.

The sequence generated by this method is well defined and can be known to the receiver a priori. This can aid in training the receiver (for example an adaptive equalizer), and/or characterizing the channel by measuring the Bit Error Rates (BER). The bit error rate or bit error ratio (BER) is the number of bit errors divided by the total number of transferred bits during a studied time interval. BER is a unit-less performance measure.

The effect of transition can be easily seen in the form of eye opening in any eye-diagram. Generally, while plotting the output eye-diagram of any system two or three eyes are plotted (horizontally) in a frame. It is suggested that two eyes instead of three are plotted in a frame to ensure thorough testing of a DAC (or an optical link). In an example, for an 8-bit LFSR testing a 4-bit DAC, the transition patterns will repeat after 2^8-1=255 cycles. Now 255/3=85, this means that even on repeated plotting of eye, each of the 3 eyes will contain only 85 transitions and hence may not guarantee a proper extraction of its parameters by the proposed eye-diagram method (for cases in which 2N-1 has a factor of 3). For any case, the transitions repeat after 2N-1, which is an odd number and will never have 2 as a factor. This means that each eye will have all the transitions covered after running them for a sufficient period.

In an embodiment, for an m-bit LFSR, the maximum possible outcome can be $2^m$ bit-vectors or states 102. But, a state with bit-vector containing all '0's, will keep on repeating itself not allowing any other state to occur (as the XOR output will always be '0'). Hence, the maximum number of states that can occur is limited to 2m-1, which is the time-period of the Maximum Length Sequence (MLS) generated by LFSR 102.

To get MLS of period $2^m$-1, a primitive polynomial h(x) of degree m is required. The algebraic terms occurring in this polynomial represent the LFSR tapping positions for MLS. A primitive polynomial is an irreducible polynomial of that degree.

Figure 7:
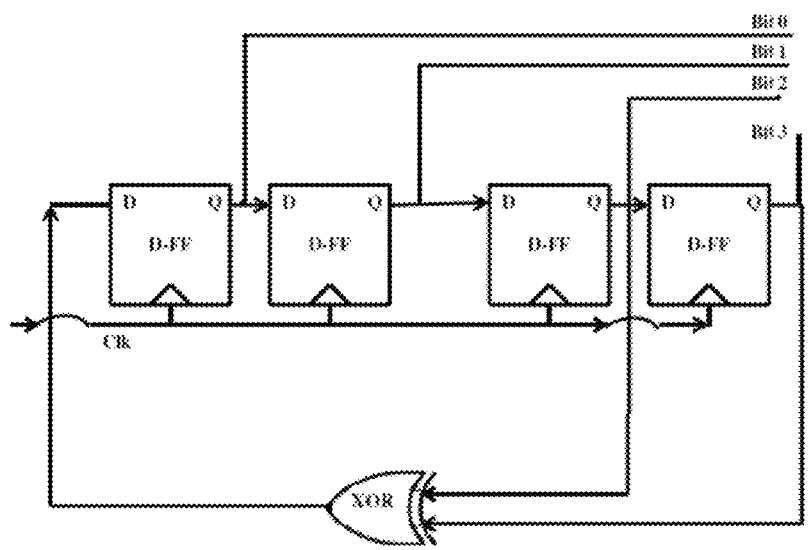
FIG. 7 depicts a 4-bit PRBS generator using a LFSR, according to embodiments as disclosed herein.

FIG. 7 depicts a 4-bit PRBS generator using a LFSR, according to embodiments as disclosed herein. In case of the 4-bit LFSR, by tapping the output of $4^{th}$ and $3^{rd}$ register as shown in FIG. 5, the primitive polynomial is $h(x)=x^4+x^3+1$. Further, change in the primitive polynomial leads to change in the occurring output sequence. Every LFSR will have at least one configuration with an MLS.

FIG. 8 is a table depicting primitive polynomials for m≤39 used to obtain MLS for a LFSR, according to embodiments as disclosed herein, made from the tapping data taken from an 8-stage maximum-cycle LFSR. This example aims at giving an insight to the working of the technique.

FIG. 9 is a table depicting output sequence of a 4-bit LFSR, according to embodiments as disclosed herein. The binary output of the LFSR is displayed in the STATE column of FIG. 6. The $B_2$ and $B_0$ of LFSR are tapped and fed to DAC input. Now, considering the state 3 in the table which represents a binary equivalent of $(9)_{10}$ in LFSR, this output is fed as a binary equivalent of $(1)_{10}$ to the DAC. It is clearly visible from the table that in state 4, the DAC input i.e. $(2)_{10}$ comes from $B_2=1$ and $B_0=0$, which is just a time-shifted version of state 3 with $B_3=1$ and $B_1=0$. Hence, it can be said that the bit vector in state 3 (value=$(9)_{10}$) contains both the current state value $(1)_{10}$ as well as the next state value $(2)_{10}$ available at the DAC input, or in other words represents a transition. From the appearance of similar exclusive states in LFSR table it can be concluded that it gives rise to an exhaustive appearance of all transition in the period of MLS. In full table, the input to DAC appears to be $(1)_{10}$ at four place for different LFSR outputs, and hence cover all four possible transitions. This last part has been further clarified in the next section.

The proposed method employs Sufficient and Necessary Condition. Sufficient condition means that the technique covers all test-vectors and transitions between them (except 0-0 transition) 105. Whereas, necessary means that it is not possible to generate multi-level signals using a PRBS generator which is less than 2m-bit long without any other additional circuitry 106.

In Sufficient Condition 105, each state in an MLS produced by 2m-bit LFSR represents a unique bit combination [$B_0$ $B_1$ $B_2$ $B_3$ $B_4$ $B_5$ $B_6$ $B_7$ $B_{2m-2}$ $B_{2m-1}$], for a 2-m bit LFSR. This bit-vector repeats itself only after the period of this MLS, i.e. $2^m$-1 cycles. Now, divide the LFSR output into odd and even bit-vectors 103. After dividing the bit vectors into even and odd bit vectors, we get:

[$B_1$ $B_3$ $B_5$ $B_7$ $B_{2m-1}$];

[$B_0 B_2$ $B_4$ $B_6$ $B_{2m-2}$];

which is a unique bit-vector pair, surely occurring atleast and only once in an MLS period.

Figure 10:
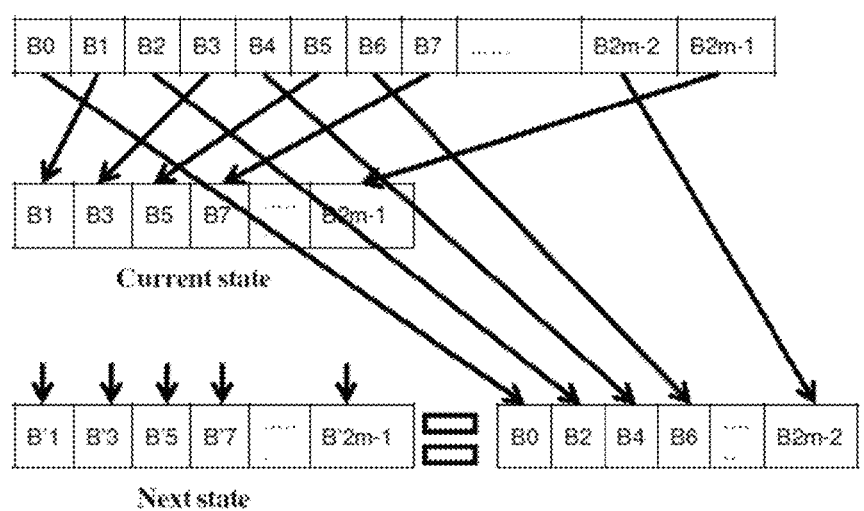
FIG. 10 is a state transition diagram. State of a 2m-bit LFSR, representing transition between current and next state of a m-bit DAC input, according to embodiments as disclosed herein.

FIG. 10 is a state transition diagram. State of a 2m-bit LFSR, representing transition between current and next state of an m-bit DAC input, according to embodiments as disclosed herein. Now, let [$B_1$ $B_3$ $B_5$ $B_7$ $B_{2m-1}$] represents the current state input being fed to DAC and the next state input be [$B'_1$ $B'_3$ $B'_5$ $B'_7$ $B'_{2m-1}$]. As in a typical LFSR, leaving the inputs fed at $B_0$, rest of the bits are shifted by one in the next transition 107. Which means,

[$B'_1$ $B'_3$ $B'_5$ $B'_{2m-1}$]=[$B_0$ $B_2$ $B_4$ $B_6$ $B_{2m-2}$]

So, it can be concluded that each LFSR bit-vector of length 2m represents a bit-vector transition. The transition can be assured to occur once in an MLS cycle, by the property of LFSR stated before. Further, multi-level pseudo random symbol sequences 110 are generated.

Figure 11:
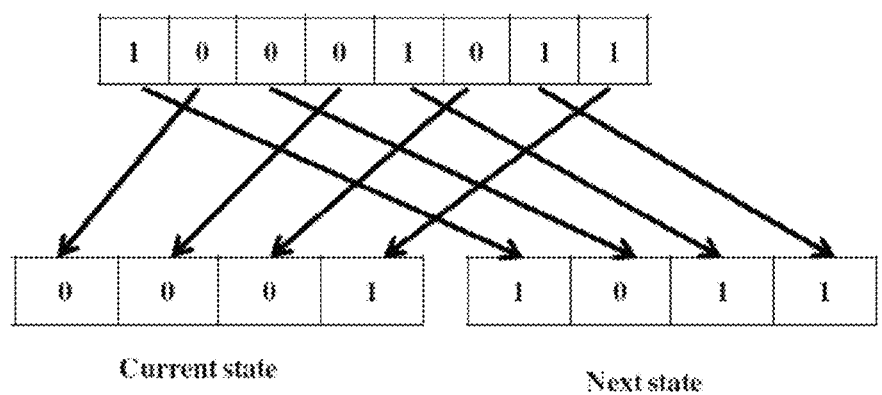
FIG. 11 is a state transition diagram. State of a 8-bit LFSR, representing transition between current and next state of a 4-bit DAC input, according to embodiments as disclosed herein.

FIG. 11 is a state transition diagram. State of an 8-bit LFSR, representing transition between current and next state of a 4-bit DAC input, according to embodiments as disclosed herein. For example, an 8-bit LFSR with a bit-vector [1 0 0 0 1 0 1 1] represents DAC current state input, Si=[0 0 0 1] and a next state input, Si+1 =[1 0 1 1]. As all 8-bit combinations (except [0 0 0 0 0 0 0 0]) will be covered (at least & only once) in one cycle of MLS. This means that the states $S_i$ and $S_{i+1}$ can and will take all possible values independent of each other. Thus, they will represent all possible transitions from all current states to all next states required to test a 4-bit DAC.

In Necessary Condition 106, for testing of an m-bit DAC, if an LFSR of less than 2m bit is taken, then at least one or more tapped bits will be adjacent 108, (except for the case of a 2m-1 bit LFSR). Now, as the next state binary value of an LFSR is just a shifted version of current state binary value; this adjacent tapping puts a limitation on the possible next state values.

Figure 12:
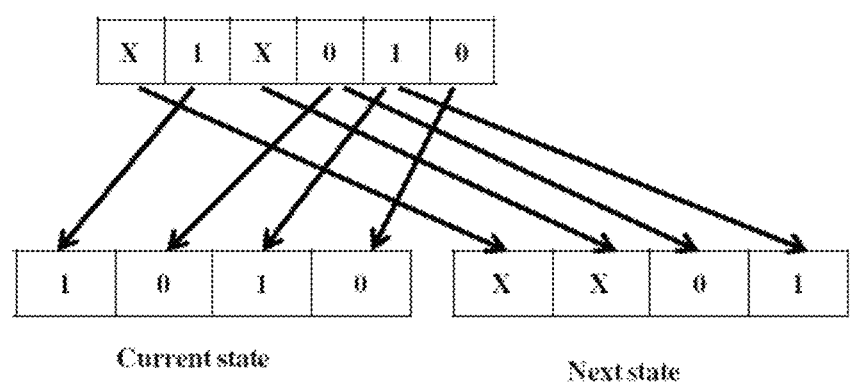
FIG. 12 is a state transition diagram. It displays possible next states for a 4-bit DAC when tested by 6-bit LFSR, according to embodiments as disclosed herein.

FIG. 12 is a state transition diagram. It displays possible next states for a 4-bit DAC when tested by 6-bit LFSR, according to embodiments as disclosed herein For example, consider a 6-bit LFSR testing a 4-bit DAC with output bits tapped at $B_1$; $B_3$; $B_4$ & $B_5$. Let the current state be [1 0 1 0] in FIG. 9. For this current state the LFSR outputs will be [X 1 X 0 1 0], where X represents an unknown output. The LFSR next state output (after shifting all bits by one) leads to the possible next state of [X X 0 1], freezing the last bits to '0' and '1'. Hence, DAC input may have only one-fourth of the possible next states, or in other words a DAC input of (A)16 can only be followed by (2)16; (6)16; (9)16 or (E)16. This restricts the transitions and makes alternate-bit-tapping a necessary criterion to cover almost all transitions. The case of a 2m-1 bit LFSR failing to cover all transitions while testing an m-bit DAC can also be understood in a similar fashion. By analogy, all LFSRs which do not satisfy the stated criteria will lead to lesser number of transitions. Hence further, multi-level pseudo random symbol sequences 110 are generated.

In special case of alternate bit tapping, 2m-1 bit LFSR for m-bit DAC 106, the bits are tapped alternately from edge to edge 109, like tapping bits [$B_0$ $B_2$ $B_4$ $B_6$] for an LFSR with [$B_0$ $B_1$ $B_2$ $B_3$ $B_4$ $B_5$ $B_6$]. Even with alternate bits, this configuration does not cover all transitions as it uses a less than 2m-bit LFSR to test an m-bit DAC. Suppose, the current (2m-1)-bit LFSR output to be [$B_0$ $B_1$ $B_2$ $B_3$ $B_4$ $B_{2m-2}$]. This means that the current state will be [$B_0$ $B_2$ $B_4$ $B_{2m-2}$] and next state [Y $B_1$ $B_3$ $B_{2m-3}$], where Y represents the XOR output. This Y is hence a dependent value which is a function of current and next state values. Hence further, multi-level pseudo random symbol sequences 110 are generated. Thus, even though alternate bits are tapped here, it can be seen that violation of predefined condition (as in this case) leads to inexhaustive testing of DAC.

Figure 13:
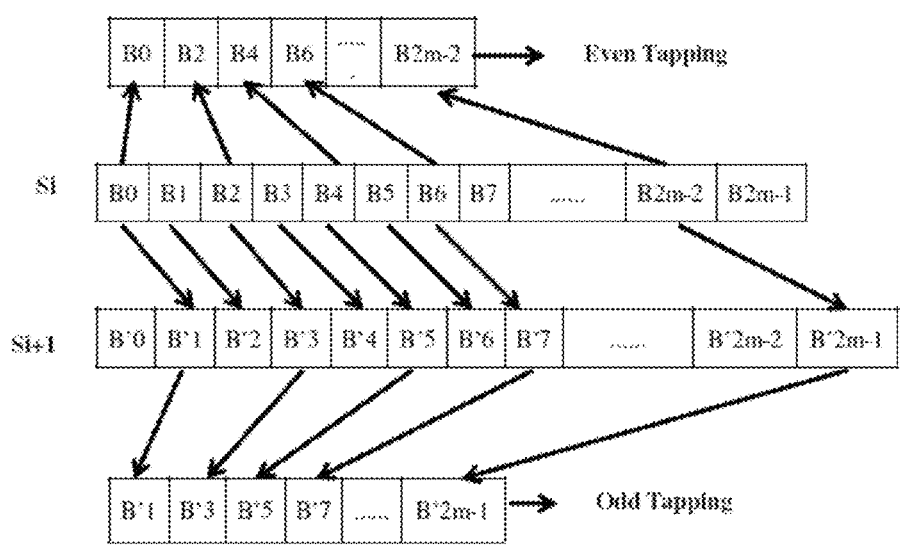
FIG. 13 is a state transition diagram. It displays DAC testing by tapping odd and even bits of LFSR, according to embodiments as disclosed herein.

FIG. 13 is a state transition diagram. It displays DAC testing by tapping odd and even bits of LFSR, according to embodiments as disclosed herein. As the occurrence of a 0-0 transition would mean that both the current and next-state are bit vectors with all bits '0'. This is possible only when all LFSR bits are '0', which does not occur in the MLS (hence a period of 2^bits-1). This makes the 0-0 a non-occurring transition for our testing methodology. However, the 0-0 transition is not really required for characterizing the dynamic behaviour of the DAC. Hence, nothing is actually lost by losing 0-0 transition. Tapping at odd or even bits of LFSR makes no difference as odd bits represent just one clock delayed version of the bit-vector available at even bits. Jitters are of two kinds, random and deterministic jitter. Covering all transitions involves all the effects due to deterministic jitter. Repeated usage of the method enable take the effect of random jitter too into account.

In an embodiment, all the analysis performed is based on that the next state value is affected only by the current state and the state before it but not by any other states before. In that case, this embodiment could further be extended to $n^{th}$-bit tapping technique using an nm-bit LFSR to test an m-bit DUT which depends on n-1 states before current state to cover almost all possibilities.

Pseudo-random signals generated by DACs using the proposed approach can also be used to test high-speed communications links with multi-level modulation formats.

FIGS. 14(a) and 14(b) are graphs depicting the eye diagrams of the output of a 4-bit DAC operating at 20 GS/s using different approaches, according to embodiments as disclosed herein. It is observed that a generated test vector from PRBS generator, not satisfying the predefined condition or not tapping the alternate bits for testing, does not cover all transitions. Eye-diagram is constructed from these transition patterns and measured. Low speed applications where dynamic behavior is not important, eye-diagram measurement works fine. The effect of transition time can be easily understood and seen in the form of eye opening in any eye-diagram. FIG. 14(a) shows the simulation result for a 4-bit DAC run by a 6-bit LFSR, covering only 63 out of 256 transitions between test-vectors. FIG. 14(a) shows that if all transitions are not covered then it makes it difficult to visualize the device performance through eye-diagram.

Figure 14:
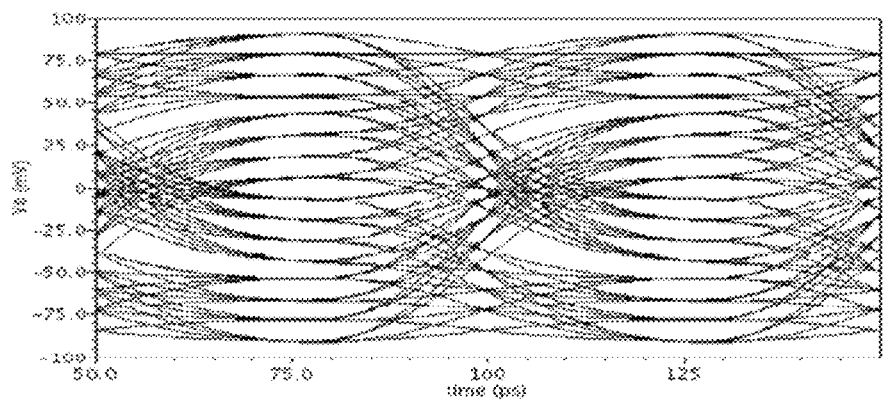
FIGS. 14a and 14b are graphs depicting the eye diagrams of the output of a 4-bit DAC operating at 20 GS/s using different approaches, according to embodiments as disclosed herein.
Figure 14:
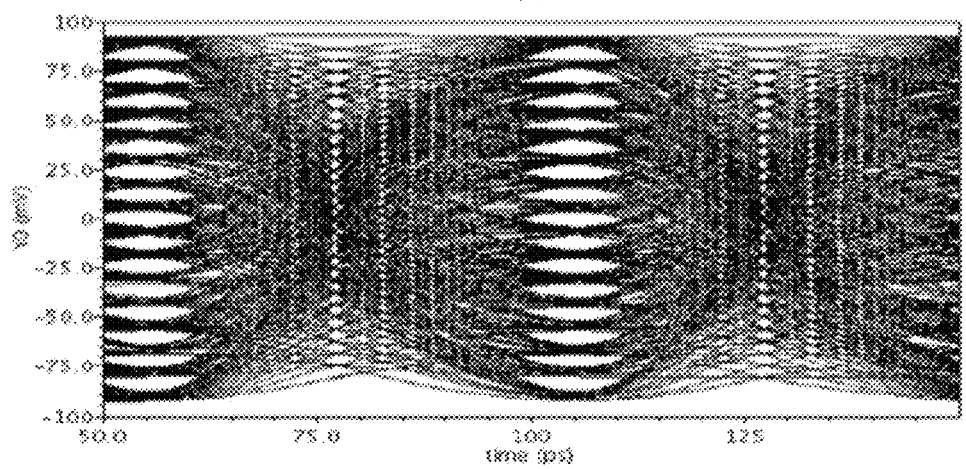

FIG. 14(b) shows the same DAC tested with an 8-bit LFSR covering 255 out of 256 possible transitions. Performance of device can be easily understood from FIG. 11(b). The eye-opening in FIG. 11(a) is 9.93 mV-12.10 mV whereas it is 6.07 mV-6.76 mV in FIG. 14(b) for almost same output swing. Thus, it could be said that improper testing can lead to wrong characterization of the device under test and hence this makes the proper testing. Wrongly tapped 8-bit LFSR can also lead to results like a 6-bit LFSR, which can result to incomplete transitions. Simulation results in FIG. 14 show the importance of covering all transitions by means of an eye-diagram.

The foregoing description uses the terms "multi-level symbols" and "multi-bit symbols" interchangeably and the fore mentioned terms denote the same thing.

The embodiments above disclose use of a square matrix (where the number of bits/symbol and LFSR size are not the same), but it may be obvious to a person of ordinary skill in the art to use a non-square matrix (where the number of bits/symbol and LFSR size are not the same).

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for generating multi level pseudo random symbol sequences for testing a transmission system, where said method comprises of
generating an N bit PseudoRandom Symbol Sequence (PRBS) by a PRBS generator;
converting N delay values for said PRBS into delay vectors;
creating a transformation matrix using said delay vectors; and
calculating percentage coverage of test vector from said transformation matrix.

2. The method, as claimed in claim 1, wherein said transformation matrix is created by stacking said delay vectors.

3. The method, as claimed in claim 1, wherein said percentage coverage of test vector is calculated as $(100/2^{N-R})\%$, where N and R are order and rank of said transformation matrix respectively.

4. The method, as claimed in claim 1, wherein said multi level pseudo random symbol sequence has at least one of
maximum percentage coverage; or
symbol sequence coverage.

5. The method, as claimed in claim 4, wherein said method further comprises of using said delay values that give full rank for maximal test-vector coverage and maximal symbol sequence coverage.

6. A system for generating multi level pseudo random symbol sequences for testing a transmission system, where said system comprises at least one means comprising of
generating an N bit PseudoRandom Symbol Sequence (PRBS) by a PRBS generator;
converting N delay values for said PRBS into delay vectors;
creating a transformation matrix using said delay vectors; and
calculating percentage coverage of test vector from said transformation matrix.

7. The system, as claimed in claim 6, wherein said system is configured for creating said transformation matrix by stacking said delay vectors.

8. The system, as claimed in claim 6, wherein said system is configured for calculating said percentage coverage of test vector as $(100/2^{N-R})\%$, where N and R are order and rank of said transformation matrix respectively.

9. The system, as claimed in claim 6, wherein said system is configured for selecting said multi level pseudo random symbol sequence, wherein said selected multi level pseudo random symbol sequence has a maximum percentage coverage.

* * * * *